March 19, 1929.  C. H. SCOTT  1,705,649
TRUCK TANK FOR LIQUIDS
Filed Nov. 8, 1927  2 Sheets-Sheet 1
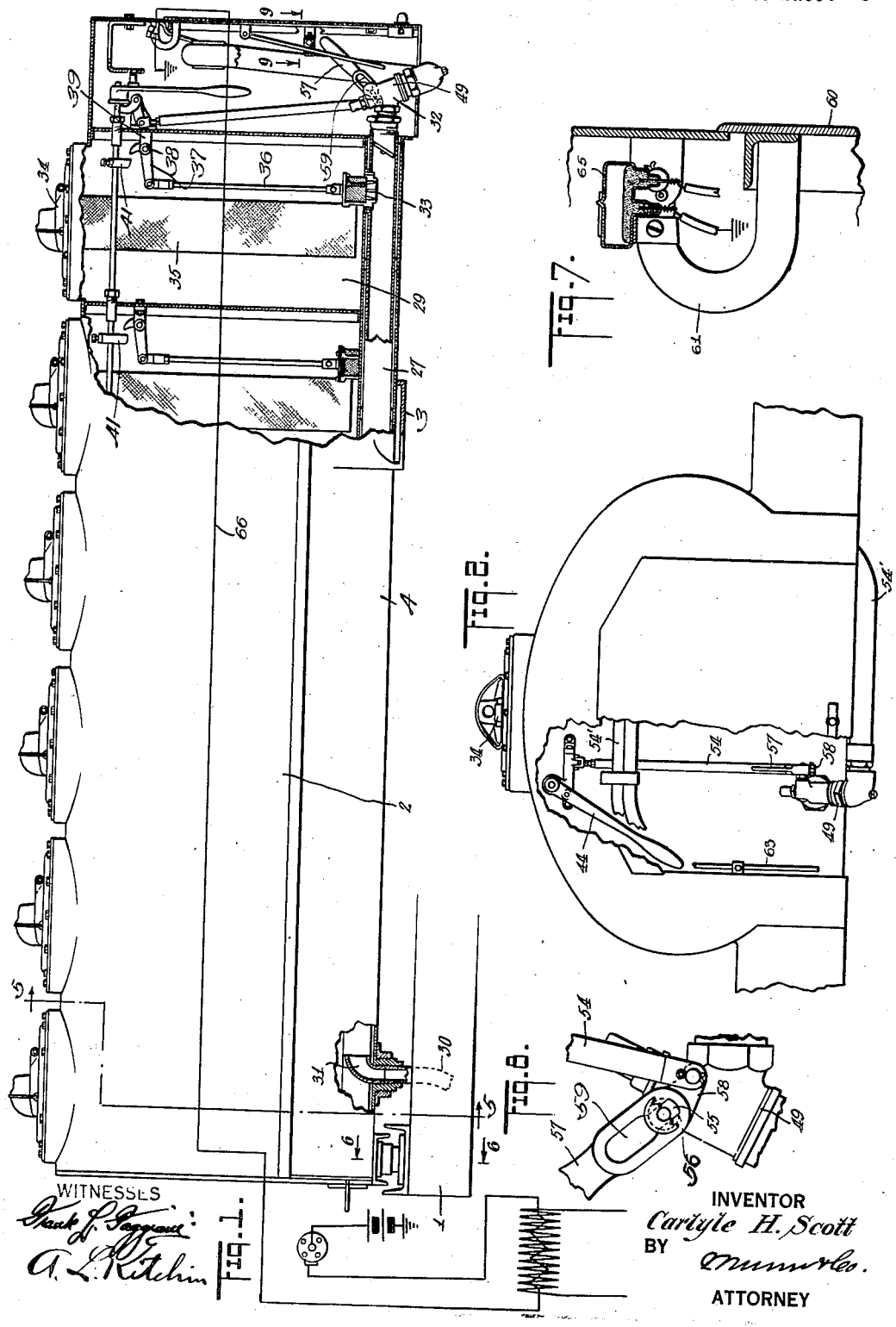
INVENTOR
Carlyle H. Scott
BY
ATTORNEY March 19, 1929.                  C. H. SCOTT                    1,705,649
                            TRUCK TANK FOR LIQUIDS
                             Filed Nov. 8, 1927              2 Sheets-Sheet 2
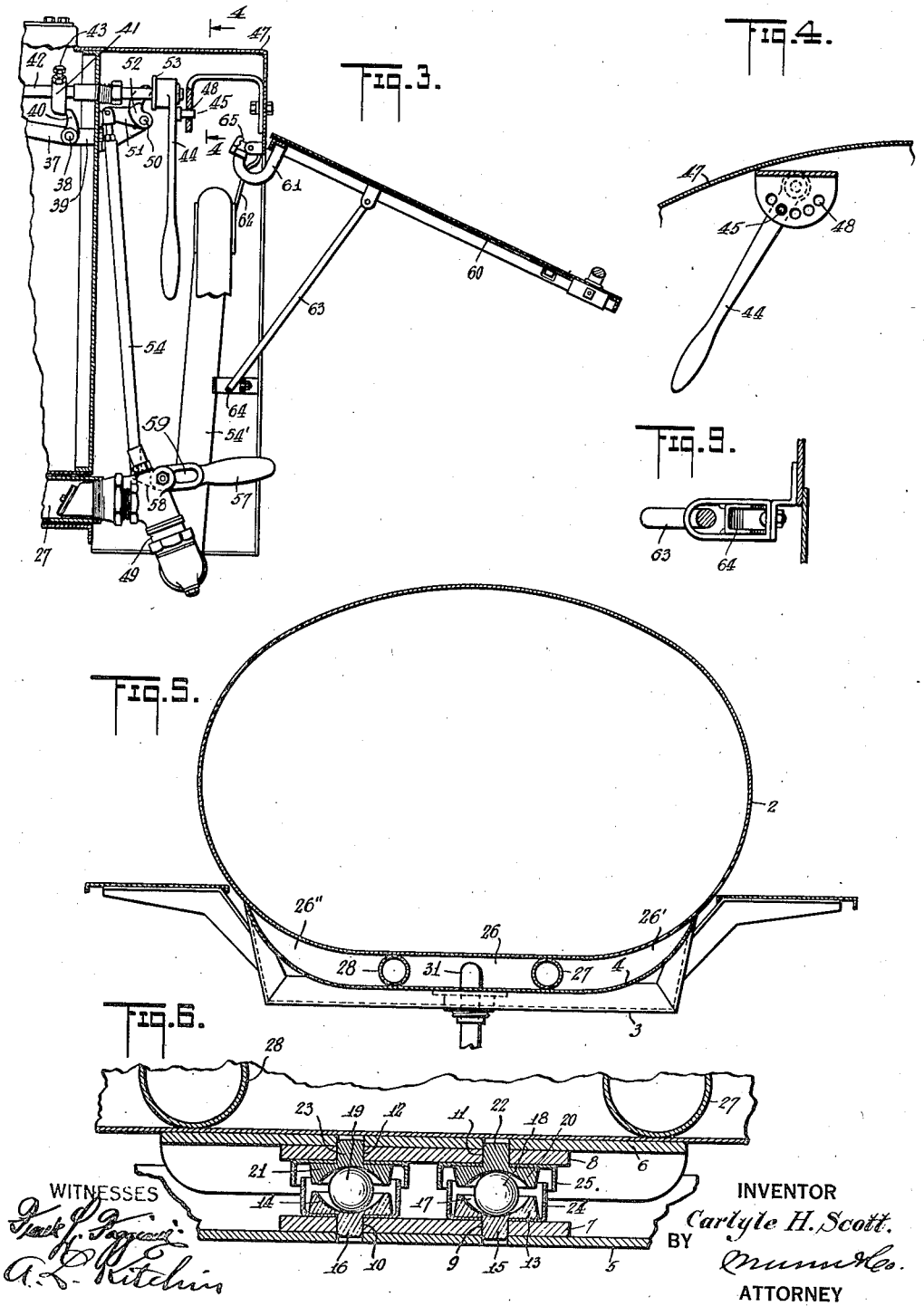
INVENTOR
Carlyle H. Scott.
BY
ATTORNEY Patented Mar. 19, 1929.

1,705,649

UNITED STATES PATENT OFFICE.

CARLYLE H. SCOTT, OF NEW YORK, N. Y.

TRUCK TANK FOR LIQUIDS.

Application filed November 8, 1927. Serial No. 231,979.

This invention relates to truck tanks for liquids, and has for an object to provide an improved construction wherein a number of independent containers are provided in a single tank and associated with means whereby the contents of the various containers are heated.

Another object of the invention is to provide an improved truck tank wherein the support or suspension is formed to permit ready twisting of the chassis of the truck without straining the tank portion.

An additional object is to provide a truck tank, wherein independent compartments are presented with means for drawing from any compartment, and a safety control device for preventing the starting of the engine of the truck while any of the compartments are discharging.

In the accompanying drawings—

Figure 1 is a side view of the tank and certain associated parts of a truck tank disclosing an embodiment of the invention, certain parts being broken away for disclosing certain interior mechanism.

Figure 2 is an end view of the structure shown in Figure 1, certain parts being broken away for illustrating certain interior mechanism.

Figure 3 is an enlarged vertical longitudinal sectional view of the rear part of the tank shown in Figure 1, illustrating the position of the parts when the rear door is open.

Figure 4 is a fragmentary elevation of a control lever, controlling the operation of the usual valves of the various compartments of the tank shown in Figure 1.

Figure 5 is a sectional view through Figure 1, approximately on line 5—5.

Figure 6 is an enlarged fragmentary sectional view through Figure 1, approximately on line 6—6.

Figure 7 is an enlarged detail fragmentary sectional view showing the hinge and mercury switch illustrated in Figure 1.

Figure 8 is an enlarged fragmentary side elevation of the discharge valve, looking at the same from the opposite side to that illustrated in Figure 1.

Figure 9 is an enlarged fragmentary sectional view through Figure 1 on line 9—9.

Referring to the accompanying drawings by numerals, 1 indicates part of the chassis of a truck, and on this truck is arranged the tank 2. A detail description of the truck will not be given as the construction of the truck is old and well known, except the bearing features at the front of the tank 2 and near the rear of tank 2. Near the rear of tank 2 there is provided a supporting structure 3 which may be made of channel iron and welded or otherwise secured to the body of tank 2 or to an apron 4, which in turn is welded or otherwise secured to the body of the tank 2. By reason of this construction there is a horizontal flat surface adapted to rest against part of the chassis. At the front, a pair of bearings are provided as shown particularly in Figures 1 and 6.

As indicated in these figures, there is provided a lower plate 5 and an upper plate 6. The upper plate 6 is a channel iron welded or otherwise rigidly secured to the tank 2 and the lower plate 5 is a channel iron welded or otherwise rigidly secured to the chassis 1. Bearing plates 7 and 8 are welded or otherwise secured to plates 5 and 6. These bearing plates are formed with apertures 9, 10, 11 and 12 which register with single apertures in plates 5 and 6. Cup bearings 13 and 14 are supported by the bearing plates 7, and these cup bearings are formed with integral extensions 15 and 16 projecting through the respective openings or apertures 9 and 10. The respective cup bearings 13 and 14 are formed with rounded cavities 17 for receiving the respective balls 18 and 19. These balls support the bearing cups 20 and 21, which bearing cups are formed with rounded sockets and with extensions 22 and 23 projecting through the apertures 11 and 12. Suitable dust cups 24 and 25 are provided for each of the bearing members, said cups if desired, being supplied with oil. It will be noted that the curve of the various sockets is much greater than the curve of the balls 18 and 19 whereby an appreciable lateral movement may be permitted while the balls are still functioning. When the truck is in use, quite often there is a twist in the action between the front and rear, and this freedom of movement of the front will compensate for this twisting action, while at the same time permitting the balls to properly support the front of the tank 2.

The apron 4 preferably extends from the front to the rear of the tank 2 for its full length, and the space 26 is divided by the tubes 27 and 28. These tubes are preferably welded to the apron 4, and at intervals to the body of the tank whereby the tank is reinforced or braced and at the same time one of the pipes, namely, pipe 27, is used as a dispensing pipe for dispensing the liquid from the various containers 29 formed in the tank 2. As the bottom of the tank 2 rests on the pipes 27 and 28, the irregularity of the bottom causes certain openings so that air may freely pass from a position between the pipes to the space on the outside of the pipes.

As shown in Figure 1, a pipe or hose 30 is connected with the elbow 31, which discharges into the space between pipes 27 and 28. The tube or hose 30 is connected to the exhaust of the engine of the truck so that the exhaust may be discharged into the space 26 substantially centrally thereof. As this exhaust is warm, it will heat the various parts of the tank, particularly as the heated gases and air may slowly pass the pipes 27 and 28 to the outside part of space 26. Preferably one or more openings are provided at the front of the tank to permit air and gas to pass out of the side spaces 26' and 26''. It will be understood that pipe 27 is completely closed from the outside or from the space 26 except the end carrying the discharge valve 32 and where the various valves 33 enter the pipe. It will be understood that there is a valve 23 leading from each of the compartments 29 into pipe 27. A mechanism has been provided as hereinafter described for actuating the various valves 33 so that gasoline or other liquid may be drawn from any of the compartments. Each of the compartments 29 is filled independently through a suitable filling structure 34, the details of which form no part of the present invention. This filling structure, however, includes a suitable frame connected to the respective compartments, said frame having an opening normally closed air-tight by a covering member. Extending downwardly from each of the openings in the filling structure is a foraminous tube 35. This tube is designed to comply with certain laws in certain States where gasoline or other highly volatile liquids are being transported in tanks. Each of the valves 33 is normally closed and is opened by being raised vertically. A link 36 is connected to each of the valves 33 and each link is connected to a lever 37 pivotally mounted at 38 to a suitable bracket 39. An arm or spur 40 is rigidly secured to or formed integral with lever 37 and is positioned to strike the abutment or stop 41 rigidly secured to the rod 42 in any suitable manner, as for instance, by a set screw 43. The respective abutments 41 in the respective tanks are arranged out of line, and in fact, are offset slightly more and more from the rear compartment to the front compartment. Rod 42 at the rear, is rigidly secured to a lever 44, which lever has a stub shaft 45 rigidly secured thereto. A plate 46 is secured to the rear casing or housing 47, said plate carrying a plurality of apertures 48 arranged in the arc of a circle. There is an aperture 48 for each of the abutments 41 so that when the lever 44 is positioned so that shaft 45 is opposite the first aperture at one end of the row of apertures, rod 42 may be pulled longitudinally toward the rear and the abutment 41 of the last compartment at the rear of the tank will be moved over so as to engage the arm 40 and swing the same, together with arm 37, so that rod 36 of that compartment will be pulled and the valve 33 of that compartment open. All of the abutments 41 are moved, but as only one is in line with an arm 40, only one valve will be open. If it is desired to remove gas from the second tank, lever 44 is moved over until the shaft 45 is opposite the second aperture 48. This is carried throughout so that the valves in any of the compartments may be operated whereby liquid may be drawn from the forward tank, the center tank or any of the tanks in order.

In order that the respective valves 33 may be open at the same time that valve 49 is open, suitable connecting mechanism has been provided between valve 49 and rod 42. This includes a pivotal pin 50 which carries a link 51 having an arm 52 rigidly secured thereto or formed integral therewith. Arm 52 has the free end positioned to normally rest against the enlarged end 53 of the hub of lever 44. A link 54 is connected to the free end of lever 51 so that when link 54 is moved upwardly, arm 52 will press against end 53 and move rod 42 longitudinally a sufficient distance to open one of the valves 33. When any of the valves 33 open, liquid is discharged into the pipe 27 and flows into the valve 49, and from thence out through the discharge hose 54. Valve 49 may be any suitable kind which is closed by a spring, preferably an internal spring. This valve is provided with a shaft 55 extending therefrom, said shaft being at the outer end substantially rectangular for receiving the slot 56 in lever 57. Shaft 55 is also provided with a crank 58 which is pivotally connected with rod or link 54, whereby whenever lever 57 is swung downwardly to open valve 49, rod or link 54 will be elevated for moving rod 42 and associated parts. As indicated in Figure 1, the valve 49 is closed, while in Figure 3, the valve is shown open. Lever 57 is provided with a comparatively large opening 59 merging into the slot or opening 56. This is provided so that in case the valve is open as shown in Figure 3, and the door 60 falls and strikes the outer end of lever 57, it will move the lever longitudinally so that the portion carrying the slot 56 will move away from the shaft 55 and the part of the lever carrying opening 59 will move over until the shaft 55 is substantially centrally of opening 59. As the valve 49 is automatically closed by an internal spring, said spring will begin to function and will immediately close the valve as soon as the lever 57 has been moved as just described as the shaft 55 is completely released.

In Figure 3 it will be seen that the door 60 is pivotally supported by a suitable hinge 61 connected with the casing 47. The casing 47 is preferably a sheet metal casing at the rear end of the container adapted to contain most of the valve 49 and associated parts. A suitable hanger 62 is provided for the nozzle 4, said nozzle being removable from this hanger when the device is in use. A brace 63 is pivotally connected with door 60 and normally rests on a saddle 64 which is held in place by suitable fusible material so that in case of fire, the saddle 64 will give way and the door 60 will fall by gravity to the position shown in Figure 1, and in doing so, will strike lever 57 if valve 49 is open. When this happens, lever 57 will be moved over as heretofore described, and valve 49 will thereby be permitted to close. This action of the various parts will close the casing 47 and thereby protect the parts against fire. In addition to these features in connection with door 60, means have been provided for preventing the truck from starting when door 60 is open. This means consists of a mercury contact structure 65, which is broken or open when the door 60 is opened, and which is closed when the door 60 is closed. A suitable wire or other conductor 66 is connected with the contacts 65 and with the spark coil of the engine of the truck. No current can go through the spark coil when the door 60 is open, but when the door 60 is closed, the mercury switch or contact 65 will be closed and, consequently, the spark coil and other parts of the engine may function in the usual manner.

What I claim is:

1. A truck tank for liquids, including an enclosing casing, a pair of longitudinal tubular supports connected to the lower part of said casing, an apron enclosing said supports and extending substantially parallel to the lower part of the casing for most of its distance whereby a chamber will be provided beneath the casing, and means for directing heated gas into said chamber.

2. A truck tank for liquids, comprising a casing, means in the casing presenting separate compartments, a pair of stiffening and supporting tubes connected with the casing at the lower part and spaced on opposite sides of a central line, valve means providing communication between said various compartments and one of said tubular members whereby the last mentioned tubular member may act as a discharge passage-way for all of the compartments, and means connected near the front and rear of the casing for supporting the same on a chassis.

3. In a truck tank for liquids, the combination with a truck, of a casing, a pair of spaced reinforcing members connected with the casing at the lower part thereof, an enclosing apron enclosing said reinforcing members and the lower portion of the casing whereby substantially three chambers are presented, a nozzle positioned to discharge into the central chamber, and tubular means for directing gaseous matter into said central chamber.

4. In a truck tank, a casing, means in the casing providing a plurality of compartments, a single discharge pipe, a valve in each compartment for controlling the flow of fluids from the compartments to the single discharge pipe, a discharge valve at the end of said discharge pipe, means for simultaneously opening said discharge valve and one of the other valves, and hand operated mechanism for causing said means to open any one of the valves regulating the discharge into said discharge pipe.

5. In a truck tank for liquids, a casing and means forming a plurality of compartments in the casing, a discharge pipe for said compartments, a discharge valve arranged at the end of said pipe, said valve being sprung closed, a rectangular shaft extending from said valve, a lever formed with a large rectangular opening snugly fitting said rectangular extension, and a large substantially rectangular opening merging into the first mentioned opening, said lever being capable of moving said extension for opening the valve when swung to a substantially horizontal position, a casing enclosing said lever, valve and associated parts, said casing being formed with a hingedly mounted door, and means for normally supporting said door, said door when said means fail automatically closing under the action of gravity, said door on closing striking said lever and moving the same longitudinally until the large rectangular opening surrounds said shaft whereby the shaft is relieved and the spring in the valve is permitted to function for closing the valve.

6. In a truck tank for liquids, a casing, means in the casing forming a plurality of independent compartments, a discharge valve for each compartment, a discharge pipe in communication with each of said valves, and means for independently opening each of said valves, said means including a longitudinally positioned shaft extending through all of said compartments, an abutment carried by said shaft in each compartment, means operated by said abutments for opening the respective valves, said abutments being arranged out of alignment while said means are arranged in alignment, a lever for rotating said shaft for moving any of said abutments in alignment with any of the means for operating the valves, and manually actuated means for moving said shaft longitudinally for causing any one of the abutments to function.

Signed at New York city in the county of New York and State of New York this 5th day of November A. D. 1927.

CARLYLE H. SCOTT.